United States Patent
Um et al.

(10) Patent No.: US 11,900,561 B2
(45) Date of Patent: Feb. 13, 2024

(54) DEEP LEARNING-BASED IMAGE STITCHING METHOD AND APPARATUS

(71) Applicants: ELECTRONICS AND TELECOMMUNICATIONS RESEARCH INSTITUTE, Daejeon (KR); THE INDUSTRY & ACADEMIC COOPERATION IN CHUNGNAM NATIONAL UNIVERSITY (IAC), Daejeon (KR)

(72) Inventors: Gi Mun Um, Daejeon (KR); Hee Kyung Lee, Daejeon (KR); Dae-Young Song, Daejeon (KR); Donghyeon Cho, Daejeon (KR)

(73) Assignees: ELECTRONICS AND TELECOMMUNICATIONS RESEARCH INSTITUTE, Daejeon (KR); THE INDUSTRY & ACADEMIC COOPERATION IN CHUNGNAM NATIONAL UNIVERSITY, Daejeon (KR)

( * ) Notice: Subject to any disclaimer, the term of this patent is extended or adjusted under 35 U.S.C. 154(b) by 212 days.

(21) Appl. No.: 17/532,880

(22) Filed: Nov. 22, 2021

(65) Prior Publication Data
US 2022/0164922 A1 May 26, 2022

(30) Foreign Application Priority Data

Nov. 25, 2020 (KR) .................. 10-2020-0160113
Aug. 11, 2021 (KR) .................. 10-2021-0105961

(51) Int. Cl.
*G06T 3/40* (2006.01)
*G06T 3/00* (2006.01)
(Continued)

(52) U.S. Cl.
CPC .......... *G06T 3/4038* (2013.01); *G06F 18/213* (2023.01); *G06F 18/22* (2023.01); *G06T 3/0093* (2013.01); *G06T 3/4046* (2013.01)

(58) Field of Classification Search
CPC ... G06T 3/4038; G06T 3/0093; G06T 3/4046; G06F 18/213; G06F 18/22
See application file for complete search history.

(56) References Cited

U.S. PATENT DOCUMENTS 8,693,785 B2 4/2014 Suk et al.
2014/0240452 A1 8/2014 Ki et al.
2022/0207680 A1* 6/2022 Wang ..................... G06N 3/045

FOREIGN PATENT DOCUMENTS

KR 10-0776649 B1 11/2007
KR 10-1321974 B1 11/2013
(Continued)

OTHER PUBLICATIONS

Li Li et al., "A Unified Framework for Street-View Panorama Stitching", Shandong University, <URL: https://www.ncbi.nlm.nih.gov/pmc/articles/PMC5298574/>, pp. 1-27, Dec. 22, 2016.

(Continued)

*Primary Examiner* — Casey L Kretzer

(57) ABSTRACT

A deep learning-based image stitching method and apparatus are provided. The deep learning-based image stitching method includes receiving a plurality of images including a first image and a second image stitched to the first image, extracting a feature map of the plurality of images, generating a plurality of flow maps indicating movement information of pixels of the plurality of images, based on the feature map, generating a plurality of warping images in which the pixels of the plurality of images are moved, by applying the plurality of flow maps to the plurality of images, respectively, generating a plurality of weight maps for blending the plurality of warping images, based on the feature map, and generating a stitch image in which the first image and the second image are stitched, by blending the plurality of warping images based on the plurality of weight maps.

13 Claims, 7 Drawing Sheets

(51) Int. Cl.
*G06F 18/22* (2023.01)
*G06F 18/213* (2023.01)

(56) References Cited

FOREIGN PATENT DOCUMENTS

| KR | 10-2014-0004942 A | 1/2014 |
|---|---|---|
| KR | 10-2014-0015892 A | 2/2014 |
| KR | 10-2014-0100054 | 8/2014 |
| KR | 10-2019-0009588 A | 1/2019 |
| KR | 102141319 B1 | 8/2020 |
| WO | WO2017120802 A1 | 7/2017 |

OTHER PUBLICATIONS

C. Herrmann et al., "Robust image stitching with multiple registrations", Proceedings of the European Conference on Computer Vision (ECCV), 2018.
H. Le et al., "Deep Homography Estimation for Dynamic Scenes", Proceedings of the Conference on Computer Vision and Pattern Recognition (CVPR), 2020.
Lai et al., "Video Stitching for Linear Camera Arrays", The British Machine Vision Conference, 2019.
B. He et al., "Parallax-Robust Surveillance Video Stitching", Sensors, 2016.
F. Zhang et al., "Parallax-tolerant Image Stitching", Institute of Electrical and Electronics Engineers (IEEE), 2014.
B. Xu et al., "Wide-Angle Image Stitching Using Multi-Homography Warping", Institute of Electrical and Electronics Engineers (IEEE), 2017.
Song et al., "Robust Image Stitching to Parallax based on End-to-end Deep Convolutional Neural Network", IEIE, Nov. 2020.

* cited by examiner

DEEP LEARNING-BASED IMAGE STITCHING METHOD AND APPARATUS

CROSS-REFERENCE TO RELATED APPLICATIONS

This application claims the benefit of Korean Patent Application No. 10-2020-0160113 filed on Nov. 25, 2020, and Korean Patent Application No. 10-2021-0105961 filed on Aug. 11, 2021, in the Korean Intellectual Property Office, the entire disclosures of which are incorporated herein by reference for all purposes.

BACKGROUND

1. Field of the Invention

The following example embodiments relate to a deep learning-based image stitching method and apparatus.

2. Description of the Related Art

If one scene or object is captured at different times or different viewpoints, images may be acquired in different coordinate systems. Image stitching technology is technology of generating one image by naturally connecting two or more images that partially overlap.

The image stitching technology may be divided into single-way stitching for matching images in one way and multi-way stitching for matching images in multiple ways. The single-way stitching may be used to stitch only images obtained by one scanner and/or one measuring device, and the multi-way stitching may be used to stitch images obtained by different scanners and/or different measuring devices.

The image stitching technology is implemented using technologies such as feature point extraction, feature point matching in an overlapping area, homography estimation, warping, blending, and the like.

SUMMARY

When an image is captured from a plurality of viewpoints, a parallax distortion due to a distance difference may frequently occur because a distance between an object and a capturing viewpoint may vary depending on capturing viewpoints. Therefore, there is a demand for technology for correcting a distortion due to a distance difference.

Various example embodiments may provide image stitching technology robust against parallax (e.g., a parallax distortion) based on a deep learning network.

However, the technical aspects are not limited to the aforementioned aspects, and other technical aspects may be present.

According to an example embodiment, there is provided an image stitching method including receiving a plurality of images including a first image and a second image stitched to the first image, extracting a feature map of the plurality of images, generating a plurality of flow maps indicating movement information of pixels of the plurality of images, based on the feature map, generating a plurality of warping images in which the pixels of the plurality of images are moved by applying the plurality of flow maps to the plurality of images, respectively, generating a plurality of weight maps for blending the plurality of warping images, based on the feature map, and generating a stitch image in which the first image and the second image are stitched by blending the plurality of warping images based on the plurality of weight maps.

The generating of the plurality of flow maps may include generating a first flow map indicating movement information of pixels of the first image and generating a second flow map indicating movement information of pixels of the second image.

The generating of the plurality of warping images may include generating a first warping image by applying the first flow map to the first image and generating a second warping image by applying the second flow map to the second image.

The generating of the plurality of weight maps may include generating a first weight map for the first warping image and generating a second weight map for the second warping image.

The generating of the stitch image may include applying the first weight map to the first warping image, applying the second weight map to the second warping image, and generating the stitch image by blending the first warping image to which the first weight map is applied and the second warping image to which the second weight map is applied.

The image stitching method may further include calculating a third loss function based on a weighted sum of a first loss function and a second loss function, and performing training based on the third loss function.

The first loss function may be an L1 loss function to calculate a difference between a pixel value of the stitch image and a pixel value of a ground truth image. The second loss function may be a structural similarity index measure (SSIM) loss function to evaluate loss information of the stitch image.

According to an example embodiment, there is provided a deep learning-based image stitching apparatus including a memory configured to store one or more instructions and a processor configured to execute the instructions, wherein when the instructions are executed, the processor is configured to receive a plurality of images including a first image and a second image stitched to the first image, to extract a feature map of the plurality of images, to generate a plurality of flow maps indicating movement information of pixels of the plurality of images, based on the feature map, to generate a plurality of warping images in which the pixels of the plurality of images are moved by applying the plurality of flow maps to the plurality of images, respectively, to generate a plurality of weight maps for blending the plurality of warping images, based on the feature map, and to generate a stitch image in which the first image and the second image are stitched by blending the plurality of warping images based on the plurality of weight maps.

The processor may be configured to generate a first flow map indicating movement information of pixels of the first image and to generate a second flow map indicating movement information of pixels of the second image.

The processor may be configured to generate a first warping image by applying the first flow map to the first image and to generate a second warping image by applying the second flow map to the second image.

The processor may be configured to generate a first weight map for the first warping image and to generate a second weight map for the second warping image.

The processor may be configured to apply the first weight map to the first warping image, to apply the second weight map to the second warping image, and to generate the stitch image by blending the first warping image to which the first weight map is applied and the second warping image to which the second weight map is applied.

The processor may be configured to calculate a third loss function based on a weighted sum of a first loss function and a second loss function, and perform training based on the third loss function.

The first loss function may be an L1 loss function to calculate a difference between a pixel value of the stitch image and a pixel value of a ground truth image. The second loss function may be an SSIM loss function to evaluate loss information of the stitch image.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
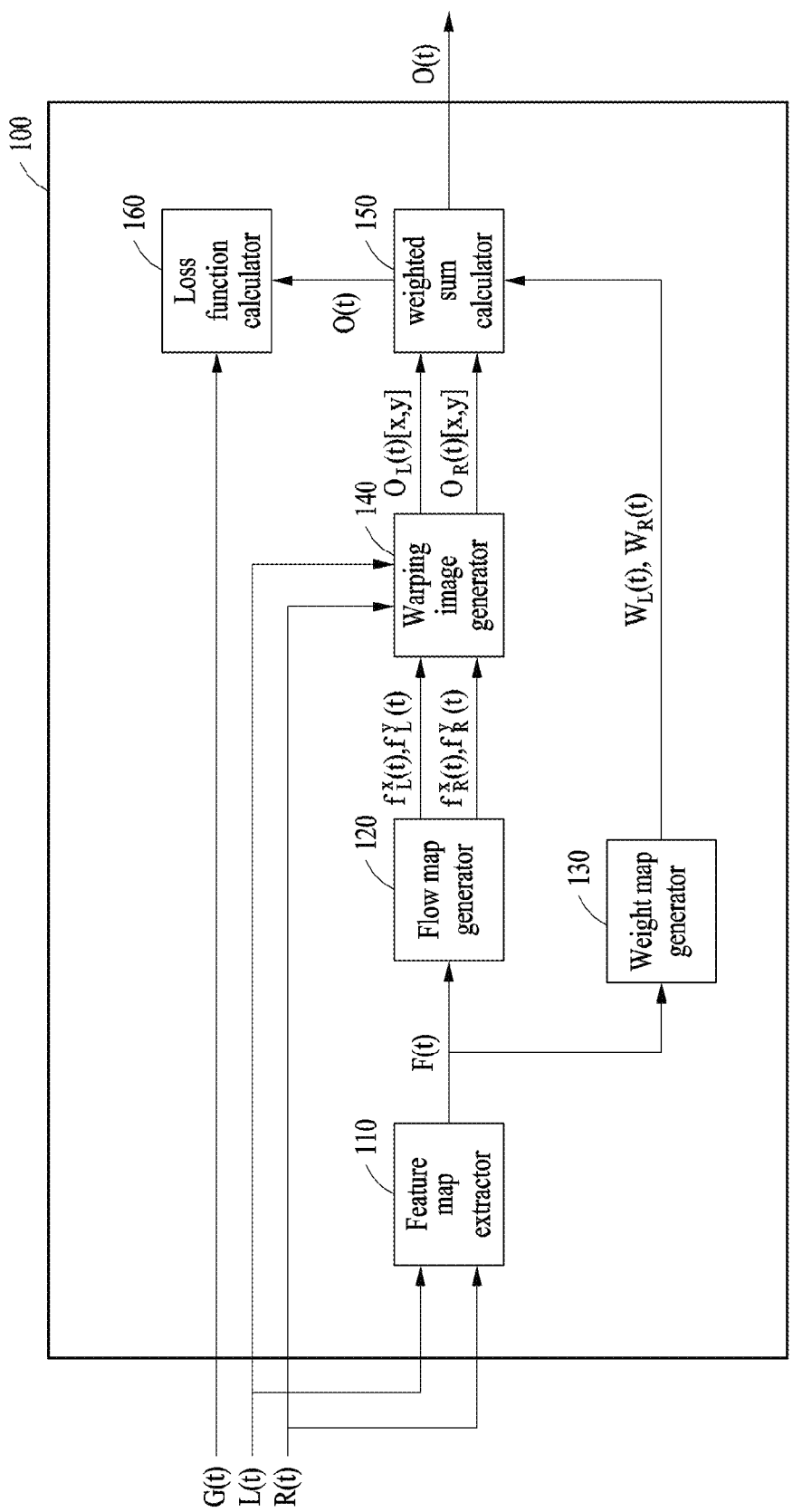
FIG. 1 is a block diagram illustrating an image stitching apparatus according to an example embodiment.

The following structural or functional description is provided as an example only and various alterations and modifications may be made to the examples. Here, example embodiments are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like elements and a repeated description related thereto will be omitted.

FIG. 1 is a block diagram illustrating an image stitching apparatus according to an example embodiment.

An image stitching apparatus 100 may receive a first image L(t) and a second image R(t) and may generate a stitch image O(t) in which the first image L(t) and the second image R(t) are stitched. In addition, the image stitching apparatus 100 may receive and learn a ground truth image H(t) in which the first image L(t) and the second image R(t) are accurately stitched. Here, the image stitching apparatus 100 may learn the ground truth image G(t) using a loss function obtained based on a weighted sum of a plurality of loss functions.

The image stitching apparatus 100 may stitch images based on a trained neural network.

The neural network (or an artificial neural network) may include a statistical training algorithm that mimics biological neurons in machine learning and cognitive science. The neural network may generally refer to a model having a problem-solving ability implemented through artificial neurons or nodes forming a network through synaptic connections where a strength of the synaptic connections is changed through learning.

A neuron of the neural network may include a combination of weights or biases. The neural network may include one or more layers, each including one or more neurons or nodes. The neural network may infer a desired result from a predetermined input by changing weights of the neurons through training.

The neural network may include a deep neural network (DNN). The neural network may include a convolutional neural network (CNN), a recurrent neural network (RNN), a perceptron, a multiplayer perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN).

The image stitching apparatus 100 may be implemented as a printed circuit board (PCB) such as a motherboard, an integrated circuit (IC), or a system on a chip (SoC). The image stitching apparatus 100 may be implemented as, for example, an application processor.

Also, the image stitching apparatus 100 may be implemented as a personal computer (PC), a data server, and the like.

The image stitching apparatus 100 may include a feature map extractor 110, a flow map generator 120, a weight map generator 130, a warping image generator 140, a weighted sum calculator 150, and a loss function calculator 160.

The feature map extractor 110 may receive the first image L(t) and the second image and may extract a feature map F(t). The feature map extractor 110 may extract a first feature map $F_L(t)$ corresponding to the first image L(t) and a second feature map $F_R(t)$ corresponding to the second image R(t). The first image L(t) may be an image captured from a left viewpoint, and the second image R(t) may be an image captured from a right viewpoint. The first image L(t) and the second image R(t) may also be acquired by a virtual simulator. The first image L(t) and the second image R(t) may partially overlap, and the first feature map $F_L(t)$ corresponding to the first image L(t) and the second feature map $F_R(t)$ corresponding to the second image R(t) may be combined. The feature map extractor 110 may extract a feature map $F(t)=\{F_L(t), F_R(t)\}$ by combining the first feature map $F_L(t)$ and the second feature map $F_R(t)$.

The flow map generator 120 may receive the feature map F(t) and may output a flow map (e.g., a first flow map and a second flow map). The flow map generator 120 may generate a first flow map $F_L^x(t)$, $f_L^y(t)$ indicating movement information of pixels of the first image L(t) and a second flow map $f_R^x(t)$, $f_R^y(t)$ indicating movement information of pixels of the second image R(t) from the feature map F(t). Coordinates of pixels of an image may be expressed as (x, y). The flow map generator 120 may generate a flow map $f_L^x(t)$ for an x-coordinate of a pixel of the first image L(t), a flow map $f_L^y(t)$ for a y-coordinate of the pixel of the first image L(t), a flow map $f_R^x(t)$ for an x-coordinate of a pixel of the second image R(t), and a flow map $f_R^y(t)$ for a y-coordinate of the pixel of the second image R(t). The first flow map $F_L^x(t)$, $f_L^y(t)$ and the second flow map $f_R^x(t)$, $f_R^y(t)$ may have the same size as that of the stitch image O(t).

The warping image generator 140 may receive an image (e.g., a first image and a second image) and a flow map (e.g., a first flow map and a second flow map) and may output a warping image (e.g., a first warping image and a second warping image). The warping image generator 140 may generate a first warping image $O_L(t)[x,y]$ in which pixels of the first image L(t) are moved according to the first flow map $f_L^x(t)$, $f_L^y(t)$ by applying (e.g., warping) the first flow map $f_L^x(t)$, $f_L^y(t)$ to the first image L(t), and generate a second warping image $O_R(t)[x,y]$ in which pixels of the second image R(t) are moved according to the second flow map $f_R^x$, $f_R^y(t)$ by applying (e.g., warping) the second flow map $f_R^x(t)$, $f_R^y(t)$ to the second image R(t). The first warping image $O_L(t)[x,y]$ and the second warping image $O_R(t)[x,y]$ may be calculated through Equation 1 shown below.

$$O_L(t)[x,y]=L(t)[x+f_L^x(t),y+f_L^y(t)]$$

$$O_R(t)[x,y]=R(t)[x+f_R^x(t),t+f_R^y(t)]. \quad \text{[Equation 1]}$$

In Equation 1, L(t) denotes a first image captured from a left viewpoint, R(t) denotes a second image captured from a right viewpoint, x and y denote coordinates of a pixel of an image, t denotes time, and $F_L^x(t)$, $f_L^y(t)$ denotes a first flow map indicating movement information of pixels of the first image, and $f_R^x(t)$, $f_R^y(t)$ denotes a second flow map indicating movement information of pixels of the second image. The warping image generator 140 may perform warping for each pixel of an image, to contribute to generation of a stitch image robust against a parallax distortion.

The weight map generator 130 may receive the feature map F(t) and output a weight map (e.g., a first weight map and a second weight map). The weight map generator 130 may generate a weight map for blending the first warping image $O_L(t)[x,y]$ and the second warping image $O_R(t)[x,y]$. The weight map generator 130 may generate a first weight map $w_L(t)$ for the first warping image $O_L(t)[x,y]$ and a second weight map $w_R(t)$ for the second warping image $O_R(t)[x,y]$. The first weight map $w_L(t)$ and the second weight map $w_R(t)$ may have the same size as that of the stitch image O(t).

The weighted sum calculator 150 may receive a warping image (e.g., a first warping image and a second warping image) and a weight map (e.g., a first weight map and a second weight map), and may output the stitch image O(t) in which the first image L(t) and the second image R(t) are stitched. The weighted sum calculator 150 may apply the first weight map $w_L(t)$ to the first warping image $O_L(t)[x,y]$ and may apply the second weight map) $w_R(t)$ to the second warping image $O_R(t)[x,y]$. The weighted sum calculator 150 may generate the stitch image O(t) by blending an image $w_L(t)*O_L(t)$ to which the first weight map $w_L(t)$ is applied and an image $w_R(t)*O_R(t)$ to which the second weight map $w_R(t)$ is applied. The stitch image O(t) may be calculated through Equation 2 shown below.

$$O(t)=w_L(t)*O_L(t)+w_R(t)*O_R(t). \quad \text{[Equation 2]}$$

In Equation 2, $w_L(t)$ denotes a time, denotes a first weight map, and, $w_R(t)$ denotes a second weight map.

The stitch image O(t) may be an image obtained by stitching the first image L(t) captured from the left viewpoint and the second image R(t) captured from the right viewpoint.

The loss function calculator 160 may calculate a loss function (e.g., a third loss function) based on a weighted sum of a plurality of loss functions (e.g., a first loss function and a second loss function). The loss function calculator 160 may set a first weight for the first loss function (e.g., an L1 function) and a second weight for the second loss function (e.g., a structural similarity index measure (SSIM) function) based on the received ground truth image G(t) and the received stitch image O(t). The first loss function may be calculated through Equation 3 shown below.

$$L1(a,b)=\Sigma|a-b| \quad \text{[Equation 3]}$$

In Equation 3, a denotes a pixel value of the stitch image O(t), and b denotes a pixel value of the ground truth image G(t). The first loss function may be an L1 function to calculate a difference between a pixel value of the stitch image O(t) and a pixel value of the ground truth image G(t). When training is performed using the first loss function, the pixel value of the stitch image O(t) may be equal to the pixel value of the ground truth image G(t). The second loss function may be calculated through Equation 4 shown below.

$$SSIM(a, b) = -\frac{(2\mu_a\mu_b + c_1)(\sigma_{ab} + c_2)}{(\mu_a^2 + \mu_b^2 + c_1)(\sigma_a^2 + \sigma_b^2 + c_2)} \quad \text{[Equation 4]}$$

In Equation 4, a denotes a pixel value of the stitch image O(t), b denotes a pixel value of the ground truth image G(t), and $\mu_a$, $\mu_b$ denote an average of pixel values of the stitch image O(t) and an average of pixel values of the ground truth image G(t), respectively. In addition, $\sigma_a^2$, $\sigma_b^2$ denote a variance of the pixel values of the stitch image O(t) and a variance of the pixel values of the ground truth image G(t), respectively. Also, $\sigma_{ab}$ denotes a covariance of the pixel values of the stitch image O(t) and the ground truth image G(t), and $c_1$, $c_2$ denote constants for stabilizing of calculation. The second loss function may be an SSIM function to evaluate loss information of the stitch image O(t). When training is performed using the second loss function, the stitch image O(t) may mimic structural naturalness of the ground truth image G(t).

The loss function calculator 160 may set the first weight for the first loss function and the second weight for the second loss function and may adjust a balance between the first weight and the second weight.

The image stitching apparatus 100 may provide an image stitching method robust against a parallax distortion caused by a difference in a distance and a depth through a flow-based deep learning network that moves pixels of an image (e.g., a first image and a second image). In addition, the image stitching apparatus 100 may perform balanced learning through a loss function obtained based on a weighted sum of a plurality of loss functions.

Figure 2A:
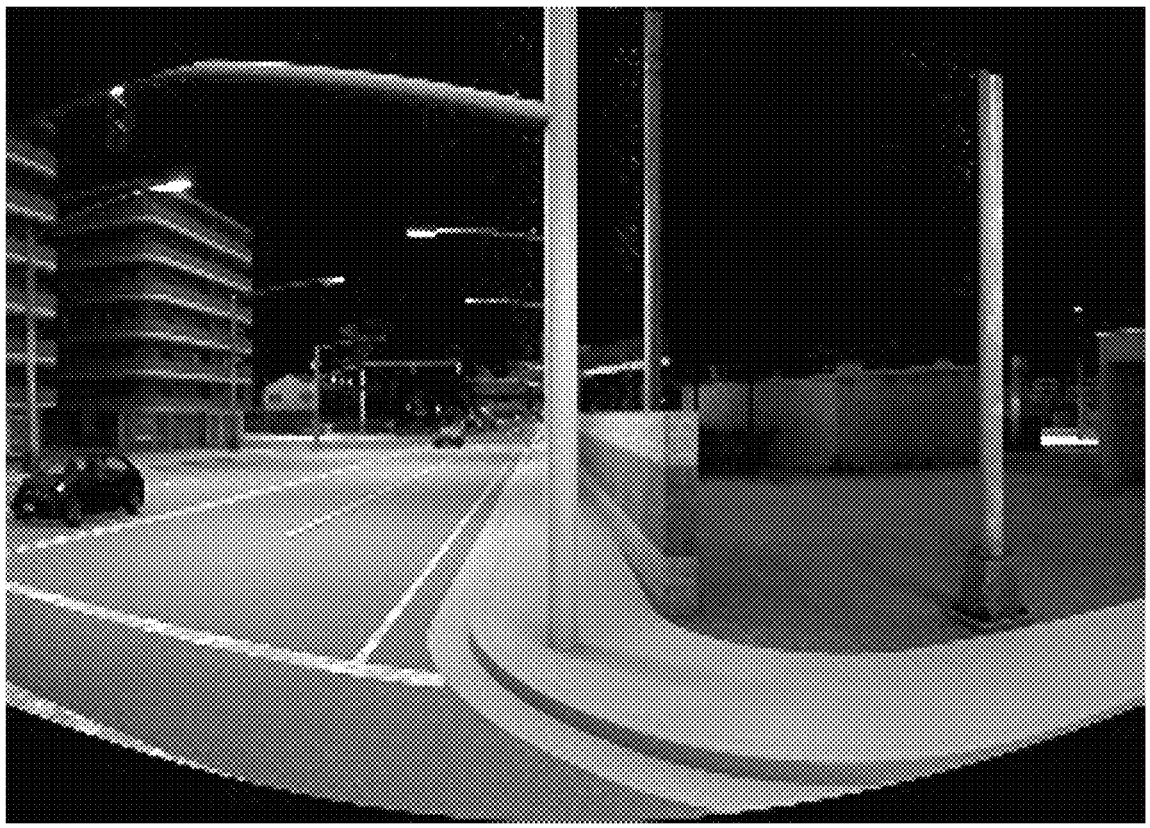
FIG. 2A illustrates an example of a first image input to the image stitching apparatus of FIG. 1.
Figure 2B:
FIG. 2B illustrates an example of a second image input to the image stitching apparatus of FIG. 1.

FIG. 2A illustrates an example of a first image input to the image stitching apparatus 100 of FIG. 1, and FIG. 2B illustrates an example of a second image input to the image stitching apparatus 100 of FIG. 1.

FIG. 2A illustrates an example of a first image L(t) that is an image captured from a left viewpoint, and FIG. 2B illustrates an example of a second image R(t) that is an image captured from a right viewpoint.

A street light on a rightmost side of the first image L(t) may be the same as a street light on a leftmost side of the second image R(t). In other words, the first image L(t) and the second image may partially overlap. The image stitching apparatus 100 may generate a stitch image by stitching the first image L(t) of FIG. 2A and the second image R(t) of FIG. 2B.

Figure 3A:
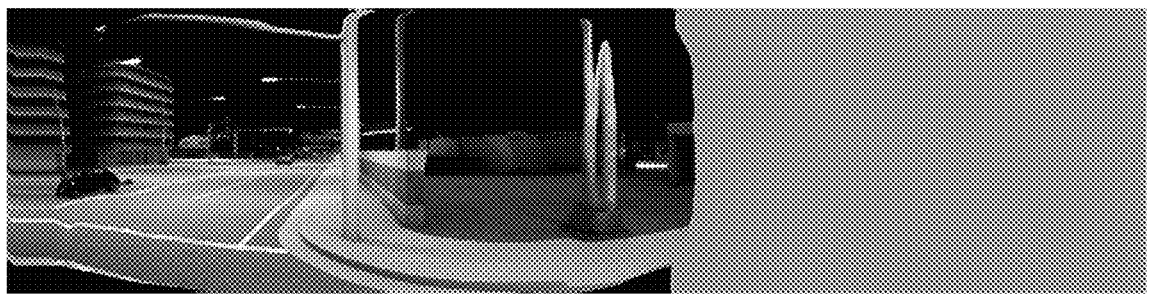
FIG. 3A illustrates an example of a first warping image generated by the image stitching apparatus of FIG. 1.
Figure 3B:
FIG. 3B illustrates an example of a second warping image generated by the image stitching apparatus of FIG. 1.

FIG. 3A illustrates an example of a first warping image generated by the image stitching apparatus 100 of FIG. 1, and FIG. 3B illustrates an example of a second warping image generated by the image stitching apparatus 100 of FIG. 1.

The first warping image $O_L(t)[x,y]$ may be an image in which pixels of the first image L(t) are moved according to the first flow map $f_L^x(t)$, $f_L^y(t)$, and the second warping image $O_R(t)[x,y]$ may be an image in which pixels of the second image R(t) are moved according to the second flow map $f_R^x(t)$, $f_R^y(t)$.

Comparing FIGS. 2A and 3A, it may be found that a left side of the first warping image $O_L(t)[x,y]$ a street lamp on the right side of the first warping image $O_L(t)[x,y]$ are bent by moving pixels of the first image L(t) in the first warping image $O_L(t)[x,y]$. In addition, comparing FIGS. 2B and 3B, it may be found that and a left side of the second warping image $O_R(t)[x,y]$ is bent by moving pixels of the second image R(t) in the second warping image $O_R(t)[x,y]$.

Figure 4:
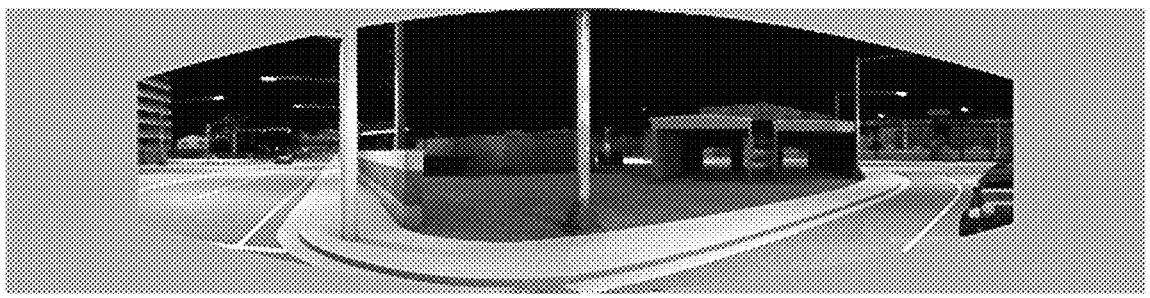
FIG. 4 illustrates an example of a stitch image generated by the image stitching apparatus of FIG. 1.

FIG. 4 illustrates an example of a stitch image generated by the image stitching apparatus 100 of FIG. 1.

The image stitching apparatus 100 may generate a stitch image O(t) by stitching the first image L(t) captured from the left viewpoint and the second image R(t) captured from the right viewpoint.

The image stitching apparatus 100 may generate warping images (e.g., a first warping image and a second warping image) by applying (e.g., warping) an image (e.g., a first image and a second image) and a flow map indicating movement information of pixels of the image, and may generate a stitch image by calculating a weighted sum on the warping images. The image stitching apparatus 100 may generate a high-quality stitch image by learning a flow map (e.g., a first flow map and a second flow map).

The image stitching apparatus 100 may provide an image stitching method robust against a parallax distortion caused by a difference in a distance and a depth through a flow-based deep learning network that moves pixels of an image (e.g., a first image and a second image).

Figure 5:
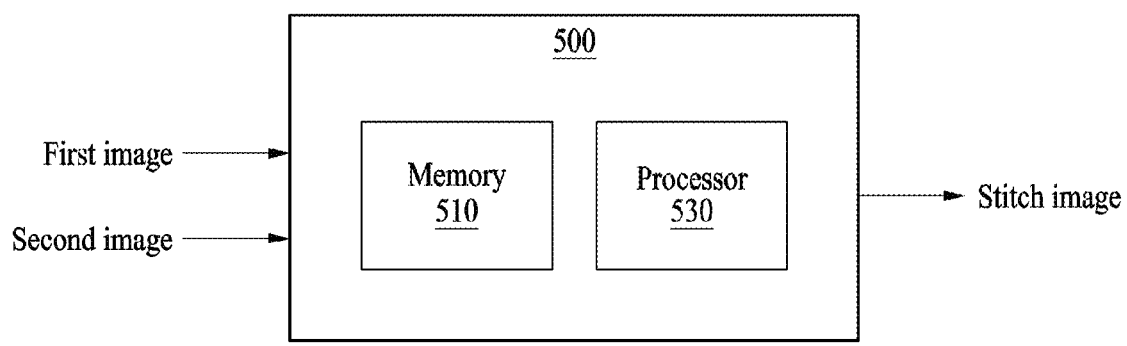
FIG. 5 illustrates another example of an image stitching apparatus according to an example embodiment.

FIG. 5 illustrates another example of an image stitching apparatus according to an example embodiment.

An image stitching apparatus 500 may be substantially the same as the image stitching apparatus 100 of FIG. 1. The image stitching apparatus 500 may include a memory 510 and a processor 530.

The memory 510 may store instructions (or programs) executable by the processor 530. For example, the instructions may include instructions to perform an operation of the processor 530 and/or an operation of each component of the processor 530.

The processor 530 may process data stored in the memory 510. The processor 530 may execute computer-readable codes (e.g., software) stored in the memory 510, and instructions triggered by the processor 530.

The processor 530 may be a hardware-implemented data processing device having a circuit that is physically structured to execute desired operations. For example, the desired operations may include codes or instructions included in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

An operation performed by the image stitching apparatus 500 may substantially be the same as those of the image stitching apparatus 100 described above with reference to FIGS. 1 to 4, and accordingly further description thereof is not repeated herein.

The components described in the example embodiments may be implemented by hardware components including, for example, at least one digital signal processor (DSP), a processor, a controller, an ASIC, a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The example embodiments described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

A number of examples have been described above. Nevertheless, it should be understood that various modifications may be made to these examples. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A deep learning-based image stitching method, the method comprising:
   receiving a plurality of images comprising a first image and a second image to be stitched to the first image;
   extracting a feature map of the plurality of images;
   generating a plurality of flow maps indicating movement information of pixels of the plurality of images, based on the feature map;
   generating a plurality of warping images in which the pixels of the plurality of images are moved, by applying the plurality of flow maps to the plurality of images, respectively;
   generating a plurality of weight maps for blending the plurality of warping images, based on the feature map, and
   generating a stitch image in which the first image and the second image are stitched, by blending the plurality of warping images based on the plurality of weight maps,
   wherein the generating of the plurality of flow maps comprises:
      generating a first flow map indicating movement information of pixels of the first image; and
      generating a second flow map indicating movement information of pixels of the second image.

2. The method of claim 1, wherein the generating of the plurality of warping images comprises:
   generating a first warping image by applying the first flow map to the first image; and
   generating a second warping image by applying the second flow map to the second image.

3. The method of claim 2, wherein the generating of the plurality of weight maps comprises:
   generating a first weight map for the first warping image; and
   generating a second weight map for the second warping image.

4. The method of claim 3, wherein the generating of the stitch image comprises:
   applying the first weight map to the first warping image;
   applying the second weight map to the second warping image; and
   generating the stitch image by blending the first warping image to which the first weight map is applied and the second warping image to which the second weight map is applied.

5. The method of claim 1, further comprising:
   calculating a third loss function based on a weighted sum of a first loss function and a second loss function; and
   performing training based on the third loss function.

6. The method of claim 5, wherein
   the first loss function is an L1 loss function to calculate a difference between a pixel value of the stitch image and a pixel value of a ground truth image, and
   the second loss function is a structural similarity index measure (SSIM) loss function to evaluate loss information of the stitch image.

7. A non-transitory computer-readable storage medium storing instructions that, when executed by a processor, cause the processor to perform the method of claim 1.

8. A deep learning-based image stitching apparatus, the apparatus comprising:
   a memory configured to store one or more instructions; and
   a processor configured to execute the instructions,
   wherein when the instructions are executed, the processor is configured to:
   receive a plurality of images comprising a first image and a second image to be stitched to the first image;
   extract a feature map of the plurality of images;
   generate a plurality of flow maps indicating movement information of pixels of the plurality of images, based on the feature map;

generate a plurality of warping images in which the pixels of the plurality of images are moved, by applying the plurality of flow maps to the plurality of images, respectively;

generate a plurality of weight maps for blending the plurality of warping images, based on the feature map, and generate a stitch image in which the first image and the second image are stitched, by blending the plurality of warping images based on the plurality of weight maps, wherein the plurality of flow maps comprising a first flow map indicating movement information of pixels of the first image and a second flow map indicating movement information of pixels of the second image.

9. The apparatus of claim 8, wherein the processor is configured to:

generate a first warping image by applying the first flow map to the first image; and generate a second warping image by applying the second flow map to the second image.

10. The apparatus of claim 9, wherein the processor is configured to:

generate a first weight map for the first warping image; and generate a second weight map for the second warping image.

11. The apparatus of claim 10, wherein the processor is configured to:

apply the first weight map to the first warping image;

apply the second weight map to the second warping image; and generate the stitch image by blending the first warping image to which the first weight map is applied and the second warping image to which the second weight map is applied.

12. The apparatus of claim 8, wherein the processor is configured to:

calculate a third loss function based on a weighted sum of a first loss function and a second loss function; and perform training based on the third loss function.

13. The apparatus of claim 12, wherein the first loss function is an L1 loss function to calculate a difference between a pixel value of the stitch image and a pixel value of a ground truth image, and the second loss function is a structural similarity index measure (SSIM) loss function to evaluate loss information of the stitch image.

* * * * *